United States Patent
Kawazoe

(10) Patent No.: US 10,480,565 B2
(45) Date of Patent: Nov. 19, 2019

(54) CONNECTING ROD MANUFACTURING METHOD AND CONNECTING ROD

(71) Applicant: TOYOTA JIDOSHA KABUSHIKI KAISHA, Toyota-shi, Aichi-ken (JP)

(72) Inventor: Takaaki Kawazoe, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/217,241

(22) Filed: Dec. 12, 2018

(65) Prior Publication Data

US 2019/0195273 A1    Jun. 27, 2019

(30) Foreign Application Priority Data

Dec. 25, 2017   (JP) .................. 2017-248195

(51) Int. Cl.
*F16C 7/02*     (2006.01)
*B23D 31/00*    (2006.01)
*F16C 9/04*     (2006.01)

(52) U.S. Cl.
CPC ............ *F16C 9/045* (2013.01); *B23D 31/002* (2013.01); *F16C 7/02* (2013.01); *F16C 7/023* (2013.01); *F16C 2220/80* (2013.01); *F16C 2240/30* (2013.01); *F16C 2240/44* (2013.01); *F16C 2360/22* (2013.01)

(58) Field of Classification Search
CPC .. F16C 7/02; F16C 9/045; F16C 7/023; F16C 2220/80; F16C 2240/30; F16C 2240/44; F16C 2360/22; B23D 31/002; B23D 31/003
See application file for complete search history.

(56) References Cited

U.S. PATENT DOCUMENTS

| | | | | |
|---|---|---|---|---|
| 3,994,054 A | * | 11/1976 | Cuddon-Fletcher | ........................ B23D 31/003 29/888.09 |
| 5,882,438 A | * | 3/1999 | Luchner | ............... B23D 31/003 148/222 |
| 6,217,222 B1 | * | 4/2001 | Mattson | ............... F16C 23/046 29/413 |
| 6,357,321 B1 | * | 3/2002 | Schmitt | ................... F16C 7/023 29/425 |

(Continued)

FOREIGN PATENT DOCUMENTS

| | | |
|---|---|---|
| DE | 195 34 360 A1 | 8/1996 |
| DE | 10 2004 026 297 A1 | 9/2005 |

(Continued)

*Primary Examiner* — Adam D Rogers
(74) *Attorney, Agent, or Firm* — Sughrue Mion, PLLC

(57) ABSTRACT

A connecting rod manufacturing method includes: forming, in an inner circumferential surface of a through-hole formed at an end of the connecting rod, a plurality of first holes as fracture start portions such that the first holes are arrayed in an axial direction of the through-hole and extend in a first direction; forming a plurality of second holes as the fracture start portions, each between adjacent ones of the first holes, such that the second holes are arrayed in the axial direction and extend in a second direction different from the first direction relative to the first holes; and fracture-splitting the end of the connecting rod into a rod part and a cap part using the fracture start portions as start points.

13 Claims, 12 Drawing Sheets

(56) References Cited

U.S. PATENT DOCUMENTS

| | | | |
|---|---|---|---|
| 7,673,388 B2 * | 3/2010 | Hase | ............... B23D 31/003 |
| | | | 29/888.09 |
| 10,309,447 B2 * | 6/2019 | Wels | .................. F16C 33/12 |
| 2005/0126660 A1 | 6/2005 | Kubota et al. | |
| 2014/0090515 A1 | 4/2014 | Gruhler et al. | |

FOREIGN PATENT DOCUMENTS

| | | | | |
|---|---|---|---|---|
| FR | 2512896 A1 * | 3/1983 | ........... | B23D 31/003 |
| JP | 58021017 A * | 2/1983 | ............. | F16C 7/023 |
| JP | 10-128481 A | 5/1998 | | |
| WO | WO-9624458 A1 * | 8/1996 | ........... | B23D 31/003 |
| WO | 2004/007980 A1 | 1/2004 | | |
| WO | 2012/136858 A1 | 10/2012 | | |
| WO | WO-2016050771 A1 * | 4/2016 | ............. | F16C 9/045 |

\* cited by examiner

COMPARATIVE EXAMPLE

COMPARATIVE EXAMPLE

COMPARATIVE EXAMPLE

COMPARATIVE EXAMPLE

EXAMPLE

COMPARATIVE EXAMPLE

COMPARATIVE EXAMPLE

COMPARATIVE EXAMPLE

COMPARATIVE EXAMPLE

FIG. 6A
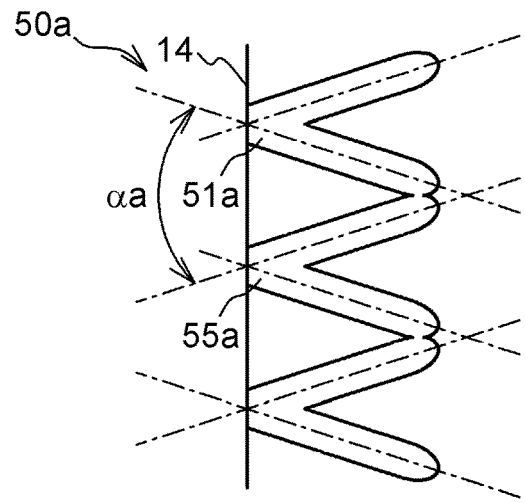
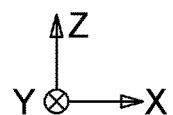
FIG. 6B
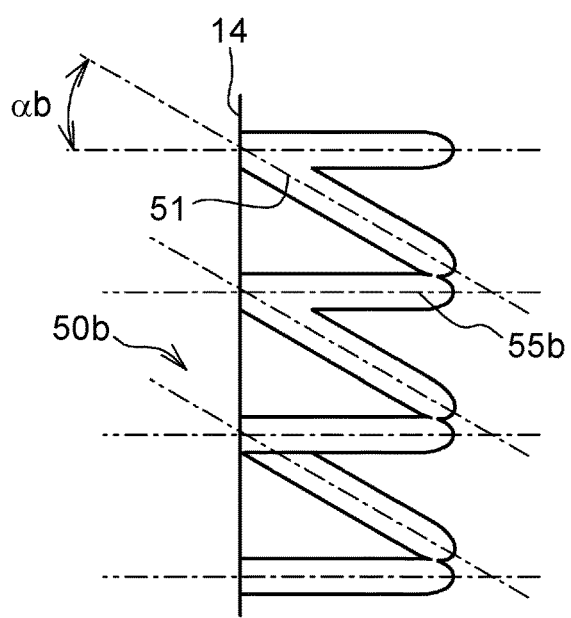
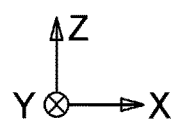

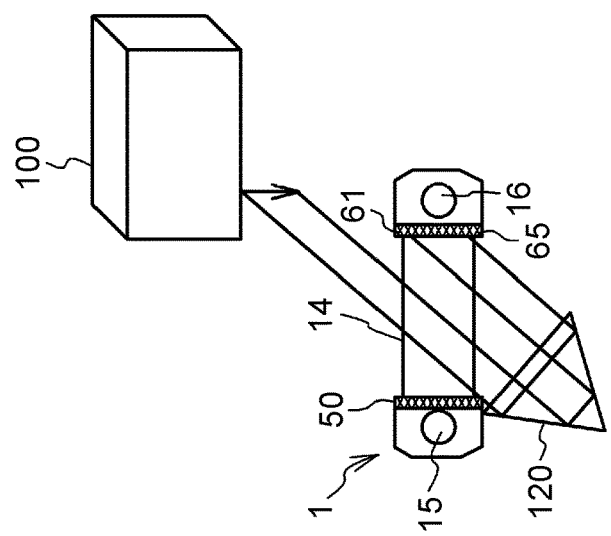
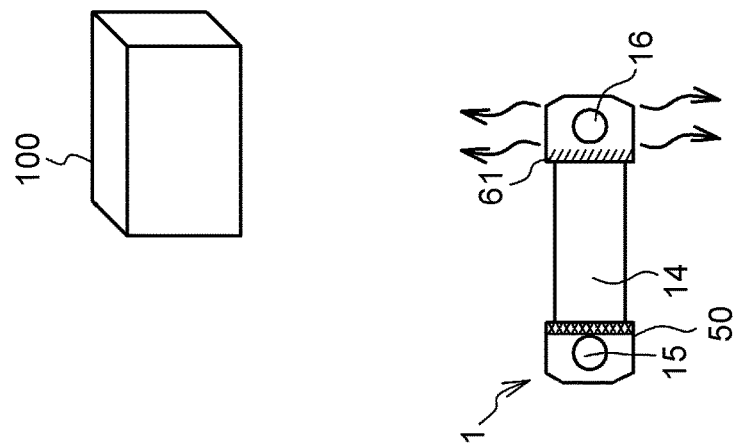
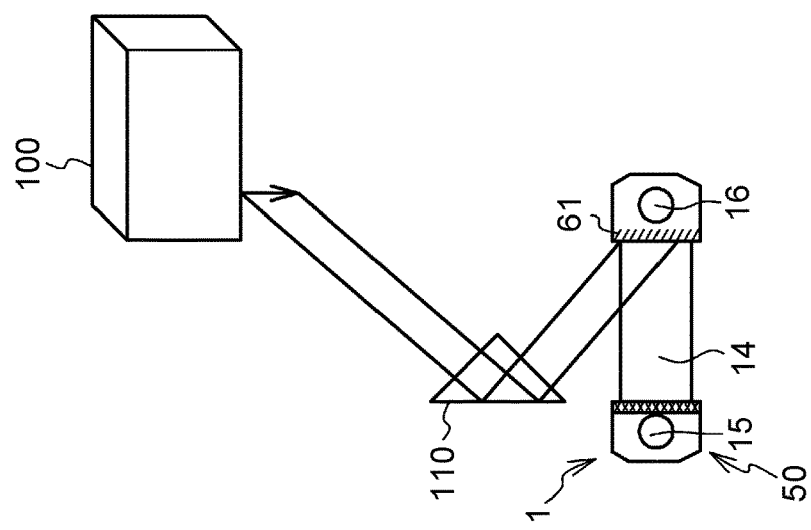

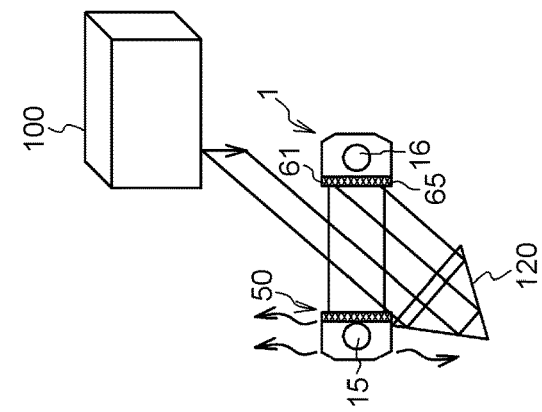
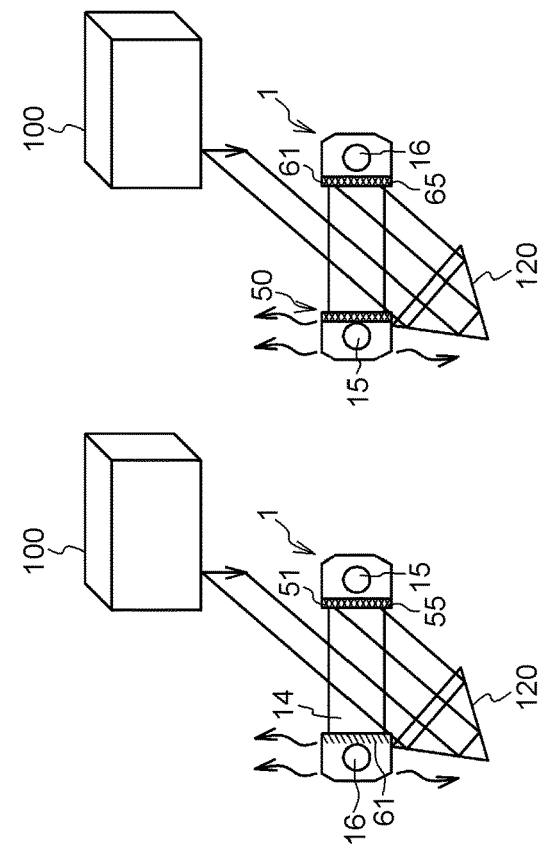
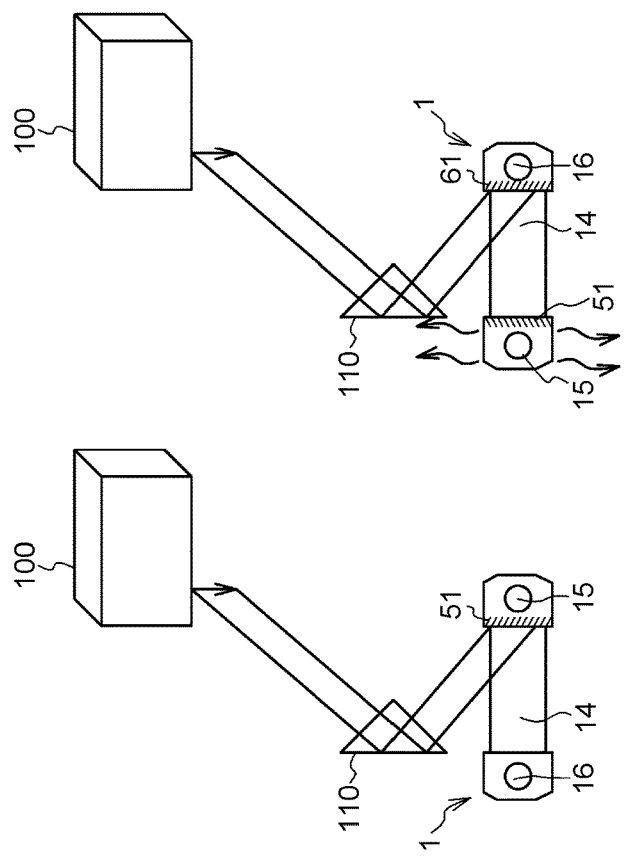

CONNECTING ROD MANUFACTURING METHOD AND CONNECTING ROD

INCORPORATION BY REFERENCE

The disclosure of Japanese Patent Application No. 2017-248195 filed on Dec. 25, 2017 including the specification, drawings and abstract is incorporated herein by reference in its entirety.

BACKGROUND

1. Technical Field

The present disclosure relates to a connecting rod manufacturing method and a connecting rod.

2. Description of Related Art

A connecting rod manufacturing method is known that involves forming, in an inner circumferential surface of a through-hole formed at an end of the connecting rod, a plurality of holes so as to extend in the same direction along an axial direction of the through-hole, and then fracture-splitting the end into a rod part and a cap part using these holes as a fracture start portion (e.g., see International Publication No. WO 2004/007980).

SUMMARY

The rod part and the cap part after fracture are assembled with the fracture surfaces positioned relative to each other. It is therefore desirable that the rod part and the cap part be fractured by brittle fracture and that the surface properties of the fracture surfaces be secured.

However, a location at which an initial crack occurs upon fracture may vary due to variations in shape and position of the holes etc. As a result, ductile fracture may occur at portions of the rod part and the cap part, which would degrade the surface properties of the fracture surfaces and reduce the positioning accuracy of the fracture surfaces.

Therefore, the present disclosure provides a connecting rod manufacturing method and a connecting rod that allow the surface properties of the fracture surfaces of the rod part and the cap part to be secured.

A first aspect of the present disclosure relates to a connecting rod manufacturing method including: forming, in an inner circumferential surface of a through-hole formed at an end of the connecting rod, a plurality of first holes as fracture start portions such that the first holes are arrayed in an axial direction of the through-hole and extend in a first direction, forming a plurality of second holes as the fracture start portions, each between adjacent ones of the first holes, such that the second holes are arrayed in the axial direction and extend in a second direction different from the first direction relative to the first holes; and fracture-splitting the end of the connecting rod into the rod part and the cap part using the fracture start portions as start points.

Since the first holes and the second holes extend in different directions and the second holes are each formed between adjacent ones of the first holes, each region surrounded by the inner circumferential surface of the through-hole and the first and second holes that are adjacent to each other constitutes a region that contributes little to fracture strength. Accordingly, the fracture strength at the fracture start portions can be reduced compared with when merely a plurality of holes extending in the same direction is formed as fracture start portions. Therefore, an even initial crack is formed upon fracture, as this initial crack occurs so as to provide communication between the first holes and the second holes arrayed in the axial direction of the connecting rod. With the initial crack thus evenly formed, variations in subsequent propagation of the crack are reduced and brittle fracture can be secured. Thus, the surface properties of the fracture surfaces of the rod part and the cap part can be secured.

The first hole and the second hole that are adjacent to each other may partially communicate with each other.

The first hole and the second hole that are adjacent to each other may communicate with each other at ends opening in the inner circumferential surface.

The first hole may communicate with one second hole, located at one end of three second holes that are adjacent to one another, at ends opening in the inner circumferential surface, communicate with another second hole, located at the other end of the three second holes, at leading ends, and communicate with the other second hole, located between the one end and the other end of the three second holes, at intermediate portions.

The first hole may communicate with one of two second holes that are adjacent to each other at ends opening in the inner circumferential surface, and communicate with the other one of the two second holes at leading ends.

The two second holes may extend in a direction orthogonal to the inner circumferential surface of the through-hole.

The second hole may communicate with one of two first holes that are adjacent to each other at intermediate portions, and communicate with the other one of the two first holes at intermediate portions.

The second hole may be shorter than the first hole.

The connecting rod manufacturing method may further include cooling the fracture start portions between forming the first holes and forming the second holes.

The fracture start portions may include a first fracture start portion and a second fracture start portion facing each other across the center of the through-hole. The first holes or the second holes may be formed as the second fracture start portion by laser beam machining, while cooling of the first fracture start portion is in progress after the first holes are formed as the first fracture start portion by laser beam machining and before the second holes are formed as the first fracture start portion.

A relationship between an inside diameter d of each of the first hole and the second hole of which leading ends are adjacent to each other and a distance A in the axial direction between the leading ends may satisfy—$(d/4) \leq A \leq d$.

A relative angle $\alpha$ between axes of the first hole and the second hole may satisfy $30° \leq \alpha \leq 150°$.

A second aspect of the present disclosure relates to a connecting rod including: a rod part having a fracture surface; and a cap part that has a fracture surface, and defines a through-hole together with the rod part in a state where the fracture surfaces are positioned relative to each other. In the second aspect of the present disclosure, in the state where the fracture surfaces are positioned relative to each other, a plurality of first holes that is arrayed in an axial direction of the through-hole and extends in a first direction from an inner circumferential surface of the through-hole, and a plurality of second holes that is arrayed in the axial direction and extends from the inner circumferential surface in a second direction different from the first direction relative to the first holes, are present between the fracture surfaces.

The present disclosure can provide a connecting rod manufacturing method and a connecting rod that allow the surface properties of the fracture surfaces of the rod part and the cap part to be secured.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 6A is an enlarged view of holes that are a modified example;

FIG. 6B is an enlarged view of holes that are a modified example;

FIG. 10A is a view illustrating the fracture start portion formation process;

FIG. 10B is a view illustrating the fracture start portion formation process;

FIG. 10C is a view illustrating the fracture start portion formation process;

FIG. 12A is a view illustrating the modified example of the fracture start portion formation process;

FIG. 12B is a view illustrating the modified example of the fracture start portion formation process;

FIG. 12C is a view illustrating the modified example of the fracture start portion formation process; and FIG. 12D is a view illustrating the modified example of the fracture start portion formation process.

DETAILED DESCRIPTION OF EMBODIMENTS

Figure 1A:
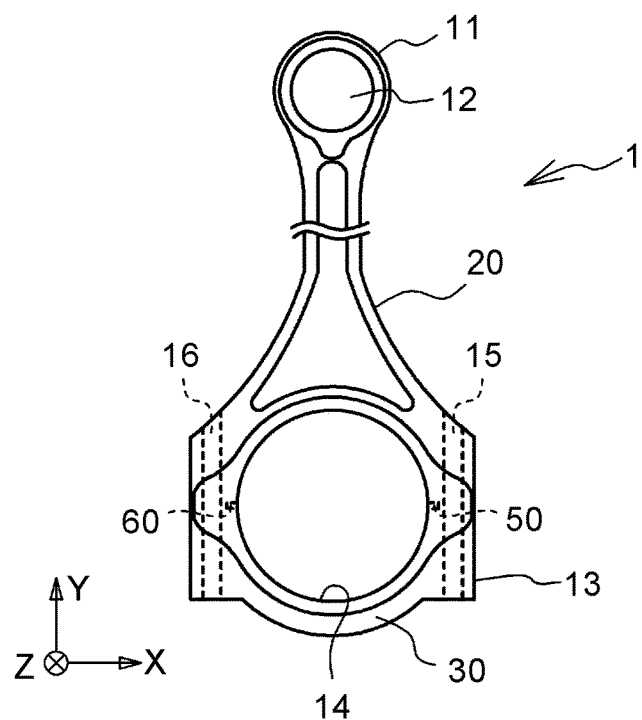
FIG. 1A is a view illustrating a base member of a connecting rod of an internal combustion engine.

FIG. 1A is a view illustrating a base member 1 of a connecting rod of an internal combustion engine. The base member 1 is a steel member formed by casting or forging. The base member 1 has a through-hole 12 formed at a small end 11 located on one end side in a Y-direction that is a long-side direction, and has a through-hole 14 formed at a big end 13 located on the other end side in the Y-direction. Upon completion, the connecting rod is installed in the internal combustion engine, with a piston pin and a crank pin inserted into the through-hole 12 and the through-hole 14, respectively.

The base member 1 has a rod part 20 and a cap part 30 that are continuous with each other in the Y-direction. In the rod part 20, the small end 11, the through-hole 12, and a half of the circle of the through-hole 14 are formed. In the cap part 30, the other half of the circle of the through-hole 14 is formed. As will be described later in detail, the rod part 20 and the cap part 30 are intended to be fracture-split using fracture start portions 50, 60 formed in an inner circumferential surface of the through-hole 14 as start points. The fracture start portions 50, 60 are formed at positions respectively on both sides of the through-hole 14 in an X-direction that is a short-side direction. The rod part 20 and the cap part 30 are fracture-split from the fracture start portions 50, 60 as start points, as a predetermined jig is inserted into the through-hole 14 and a tensile load is applied so as to separate the rod part 20 and the cap part 30 from each other in the Y-direction. Specifically, a pair of split pieces is set inside the through-hole 14 side by side in the Y-direction, and a tapered member is inserted between these split pieces. Then, impact is exerted from above on the tapered member such that the tapered member separates the pair of split pieces from each other in the Y-direction. As the pair of split pieces are thus separated from each other, a tensile load is applied so as to separate the rod part 20 and the cap part 30 from each other in the Y-direction, causing fracture splitting from the fracture start portions 50, 60 as start points. The rod part 20 and the cap part 30 have bolt holes 15, 16 into which bolts for connecting the rod part 20 and the cap part 30 to each other after fracture splitting are inserted. The bolt holes 15, 16 are also formed at positions respectively on both sides of the through-hole 14 in the X-direction.

Figure 1B:
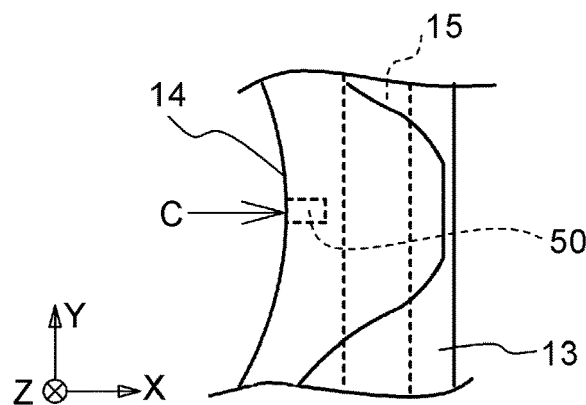
FIG. 1B is a partially enlarged view of FIG. 1A.
Figure 1C:
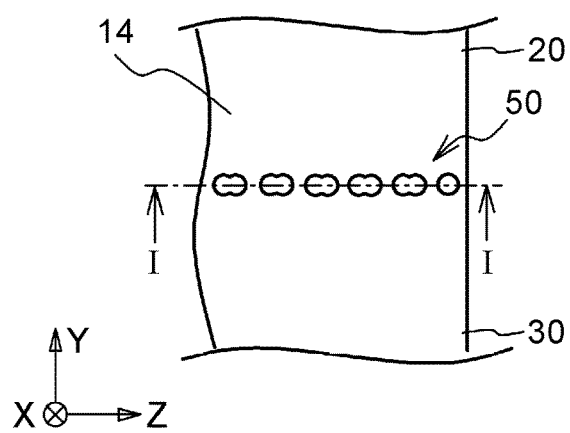
FIG. 1C is a view along arrow C in FIG. 1B.

FIG. 1B is a partially enlarged view of FIG. 1A, and FIG. 1C is a view along arrow C in FIG. 1B. The fracture start portion 50 is composed of a plurality of holes formed so as to be arrayed in a Z-direction that is a thickness direction of the base member 1 as well as an axial direction of the through-hole 14. These holes are formed such that axes thereof are included in a plane orthogonal to the Y-direction. The same description applies to the fracture start portion 60. The fracture start portions 50, 60 are examples of the first and second fracture start portions.

Figure 2A:
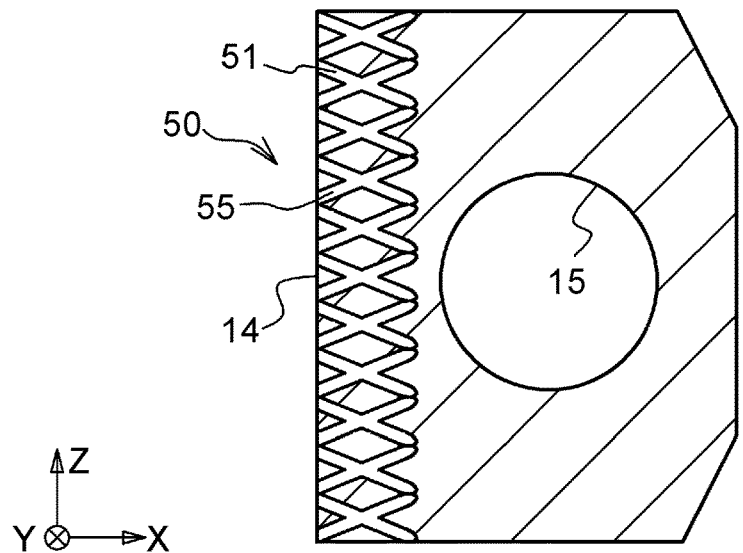
FIG. 2A is a view of section I-I in FIG. 1C.

FIG. 2A is a view of section I-I in FIG. 1C. As shown in FIG. 2A, the fracture start portion 50 is composed of pluralities of holes 51, 55. The holes 51, 55 extend in different directions from the inner circumferential surface of the through-hole 14. The holes 51 extend parallel to one another and the holes 55 extend parallel to one another. The holes 51, 55 are formed by laser beam machining. The same description applies to the fracture start portion 60. The holes 51, 55 are examples of the first and second holes.

Figure 2B:
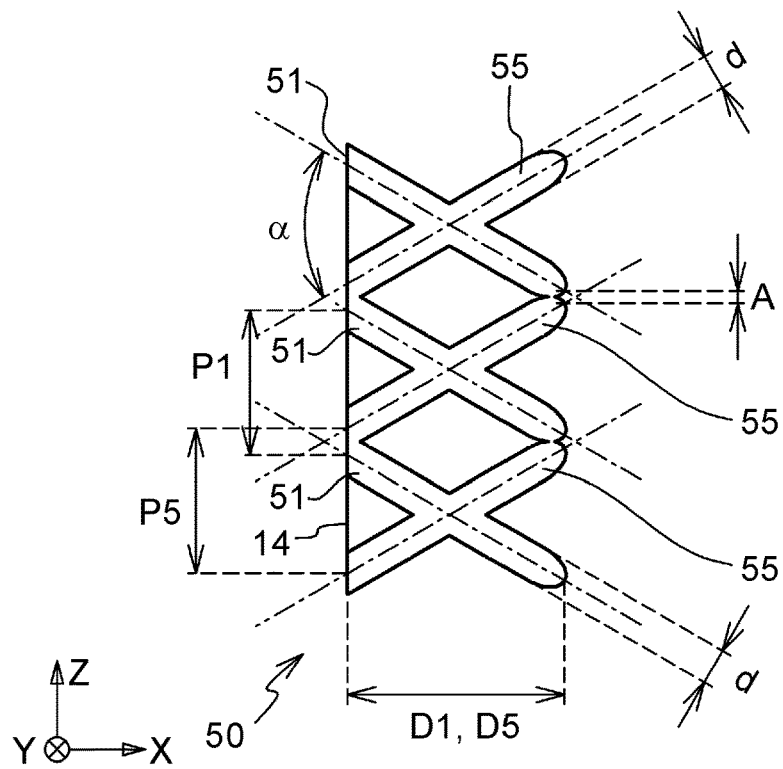
FIG. 2B is a partially enlarged view of FIG. 2A.

FIG. 2B is a partially enlarged view of FIG. 2A. Hatching is omitted in FIG. 2B. The holes 51, 55 are formed in an X-shape as seen in a sectional view, and the holes 51, 55 communicate with each other at leading ends. Inside diameters d of the holes 51, 55 are set to be approximately equal. As will be described later in detail, a depth D1 and a depth D5 in the X-direction of the hole 51 and the hole 55, respectively, are set to be approximately equal. As will be described later in detail, a pitch P1 in the Z-direction of the adjacent holes 51 and a pitch P5 in the Z-direction of the adjacent holes 55 are set to be approximately equal within a predetermined range. A relative angle α between the axes of the holes 51, 55 is set to be within a predetermined angle range. As will be described later in detail, a distance A in the Z-direction between leading ends of the holes 51, 55 of which the leading ends are adjacent to each other is set to be within a predetermined range.

The hole 51 communicates with one hole 55, located at one end of three holes 55 that are adjacent to one another, at ends opening in the inner circumferential surface of the through-hole 14, communicates with another hole 55, located at the other end of the three holes 55, at leading ends, and communicates with the other hole 55, located between the one end and the other end of the three holes 55, at intermediate portions. This means that one hole 51 communicates with three holes 55. Similarly, the hole 55 communicates with one hole 51, located at one end of three holes 51 that are adjacent to one another, at the ends opening in the inner circumferential surface of the through-hole 14, communicates with another hole 51, located at the other end of the three holes 51, at the leading ends, and communicates with the other hole 51, located between the one end and the other end of the three holes 51, at intermediate portions. This means that one hole 55 communicates with three holes 51. Thus, the holes 51, 55 communicate with each other at many portions.

Figure 3A:
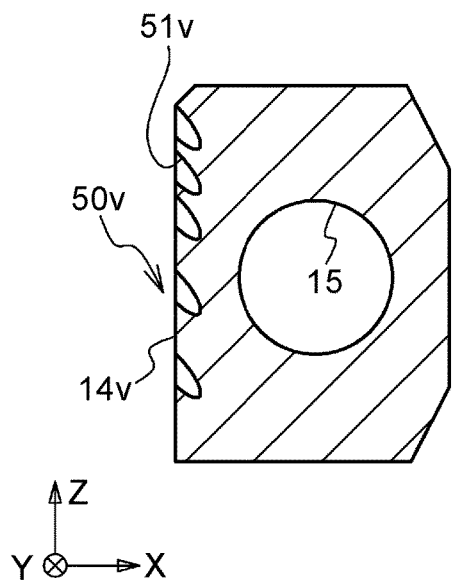
FIG. 3A is a view illustrating propagation of a crack upon fracture in a comparative example.
Figure 3B:
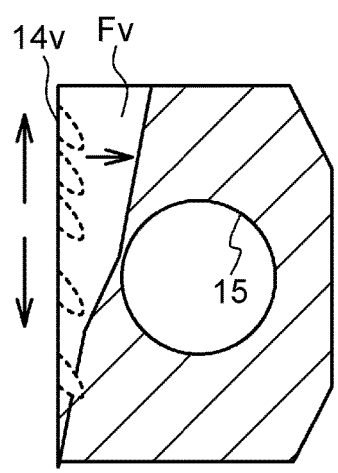
FIG. 3B is a view illustrating the propagation of the crack upon fracture in the comparative example.
Figure 3C:
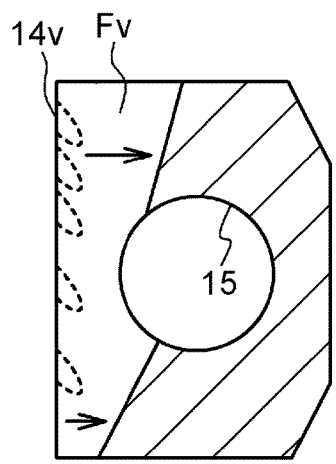
FIG. 3C is a view illustrating the propagation of the crack upon fracture in the comparative example.
Figure 3D:
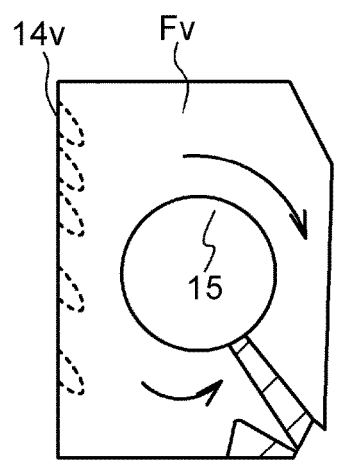
FIG. 3D is a view illustrating the propagation of the crack upon fracture in the comparative example.

Next, propagation of a crack upon fracture of the rod part 20 and the cap part 30 will be described using a comparative example. FIG. 3A to FIG. 3D are views illustrating propagation of a crack upon fracture in the comparative example. Unlike the fracture start portion 50 of the embodiment, a fracture start portion 50v that is the comparative example is composed only of a plurality of holes 51v extending in the same direction. The depth of the hole 51v is relatively small and the radius of curvature of a leading end thereof is relatively large. Moreover, the holes 51v vary widely in pitch and depth. As shown in FIG. 3B to FIG. 3D, upon fracture, a crack propagates from the fracture start portion 50v as a start point, from an inner circumferential surface side toward an outer circumferential surface side of a through-hole 14v. However, when the holes 51v vary widely in pitch and depth as described above, the location at which the initial crack occurs upon fracture is likely to vary in the Z-direction as shown in FIG. 3B. As a result, the propagation of the crack in the X-direction also varies among positions in the Z-direction as shown in FIG. 3C, so that the location at which portions of the crack join each other after propagating around the bolt hole 15 also varies as shown in FIG. 3D. When the location at which the initial crack occurs thus varies, ductile fracture accompanied by plastic deformation of material is likely to occur during propagation of the crack. Moreover, when the depth of the hole 51v is relatively small and the radius of curvature of the leading end thereof is relatively large, the factor of stress concentration around the leading end of the hole 51v is low and therefore less stress is concentrated at the leading end of the hole 51v upon fracture. This results in a higher likelihood of ductile fracture also upon occurrence of an initial crack that occurs from around the holes 51v. For these reasons, the surface properties of fracture surfaces Fv may degrade and the positioning accuracy of the fracture surfaces Fv may decrease. The factor of stress concentration around the leading end of a hole is lower as the depth of the hole is smaller and the radius of curvature of the leading end of the hole is larger.

Figure 4A:
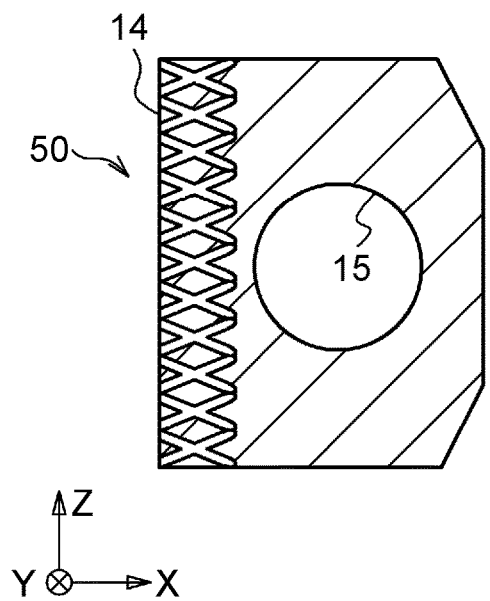
FIG. 4A is a view illustrating propagation of a crack upon fracture in the embodiment.
Figure 4B:
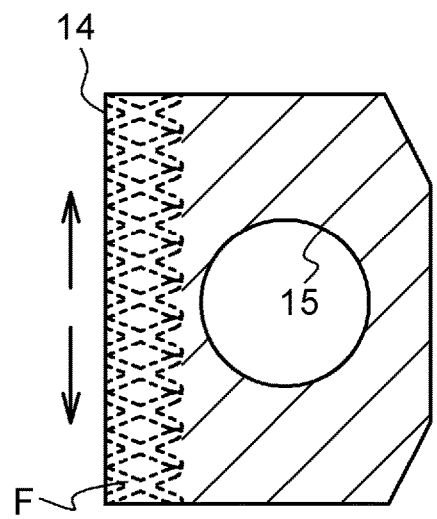
FIG. 4B is a view illustrating the propagation of the crack upon fracture in the embodiment.
Figure 4C:
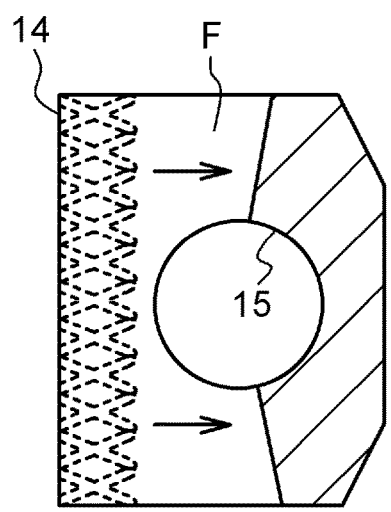
FIG. 4C is a view illustrating the propagation of the crack upon fracture in the embodiment.
Figure 4D:
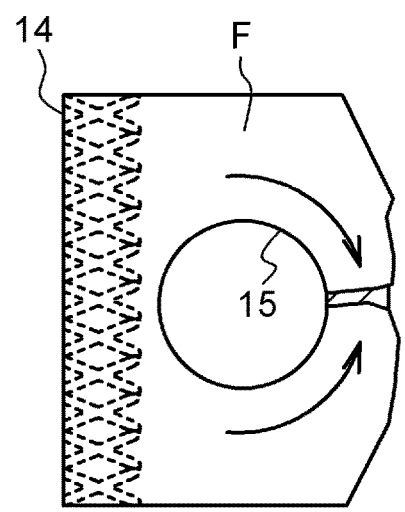
FIG. 4D is a view illustrating the propagation of the crack upon fracture in the embodiment.

FIG. 4A to FIG. 4D are views illustrating propagation of a crack upon fracture in the embodiment. As shown in FIG. 4B, an initial crack occurs roughly at the same time, without variations among positions in the Z-direction. This is because the holes 51 and the holes 55 extend in different directions and the holes 55 are each formed between adjacent ones of the holes 51. Thus, each region surrounded by the inner circumferential surface of the through-hole 14 and the holes 51, 55 that are adjacent to each other constitutes a region that contributes little to the fracture strength. Accordingly, the fracture strength is reduced when such holes 51, 55 are formed, compared with when merely a plurality of holes extending in the same direction at a constant pitch is formed as a fracture start portion. Therefore, an even initial crack is formed upon fracture, as this initial crack occurs so as to provide communication between the holes 51, 55 arrayed in the Z-direction. Specifically, upon fracture, stress concentrated at the leading end of the hole 51 affects the leading end of the adjacent hole 55, and stress concentrated at the leading end of the hole 55 affects the leading end of the adjacent hole 51, which seems to facilitate the occurrence of a crack so as to provide communication between the holes 51, 55 arrayed in the Z-direction. Thus, variations in propagation of the crack in the X-direction among positions in the Z-direction are suppressed as shown in FIG. 4C, and portions of the crack join each other after propagating around the bolt hole 15 as shown in FIG. 4D. With the crack thus propagating evenly, plastic deformation is suppressed, brittle fracture is secured, and the surface properties of fracture surfaces F are secured. Accordingly, the positioning accuracy of the fracture surfaces F is secured. From the viewpoint of securing such brittle fracture, the distance between the leading ends, the relative angle, etc. of the holes 51, 55 in the embodiment are set to be within predetermined ranges. This will be described later in detail.

Figure 5A:
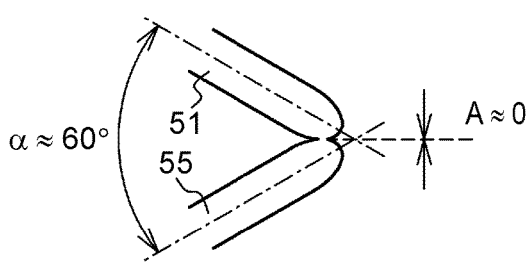
FIG. 5A is an enlarged view of leading ends of holes in the embodiment.

Next, the distance between the leading ends and the relative angle of the holes 51, 55 of the embodiment will be described in comparison with those of comparative examples. FIG. 5A is an enlarged view of the leading ends of the holes 51, 55 of the embodiment. Hatching is omitted in FIG. 5A to facilitate understanding. The distance A between the leading ends of the holes 51, 55 is set to approximately zero, and the relative angle α between the axes of the holes 51, 55 is set to approximately 60°. Since the distance A is set to zero, the holes 51, 55 communicate with each other at the adjoining leading ends.

Figure 5B:
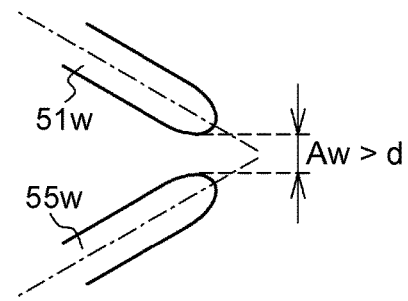
FIG. 5B is an enlarged view of leading ends of holes in a comparative example.

FIG. 5B is an enlarged view of leading ends of a hole 51w and a hole 55w of a comparative example. Reference signs similar to those of the embodiment will be used in the comparative examples to omit an overlapping description. The following description assumes that the inside diameters of the holes of the comparative examples are d and equal to the inside diameters of the holes 51, 55. A distance Aw between the leading ends of the holes 51w, 55w is set to be larger than the inside diameter d. This may make it difficult to cause interference between stress concentrated upon fracture at the leading end of the hole 51*w* and that at the leading end of the hole 55*w*. Accordingly, the location at which the initial crack occurs upon fracture may be more likely to vary among positions in the Z-direction. It is therefore preferable that the distance A satisfy A d. Since the distance A between the holes 51, 55 of the embodiment is set to approximately zero, it is easy to cause interference between stress concentrated upon fracture at the leading end of the hole 51 and that at the leading end of the hole 55. Thus, an even initial crack is formed as this initial crack occurs so as to provide communication between the holes 51, 55 arrayed in the Z-direction.

Figure 5C:
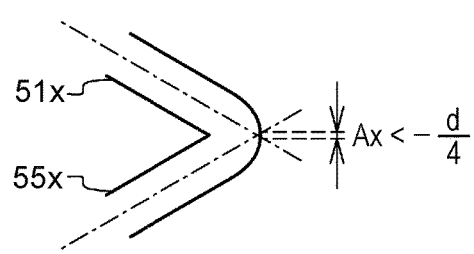
FIG. 5C is an enlarged view of leading ends of holes in a comparative example.

FIG. 5C is an enlarged view of holes 51*x*, 55*x* of a comparative example. A distance Ax between leading ends of the holes 51*x*, 55*x* is set to a value smaller than—(d/4). Thus, the holes 51*x*, 55*x* are formed so as to have a large amount of overlap at the leading ends. Here, these holes are formed by laser beam machining as described above. A large amount of overlap between leading ends as with the holes 51*x*, 55*x* means that a large amount of heat has been applied by laser irradiation to the leading ends of the holes 51*x*, 55*x* located at the same position, which may make the radii of curvature of the leading ends too large. When the radius of curvature of the leading end is too large, ductile fracture is likely to occur due to the low factor of stress concentration and less stress being concentrated at the leading end upon fracture. It is therefore preferable that the distance A satisfy—(d/4)≤A. Since the distance A between the holes 51, 55 of the embodiment is set to zero as described above, making the radii of curvature of the leading ends too large is avoided, so that the factor of stress concentration is secured and brittle fracture is secured.

Figure 5D:
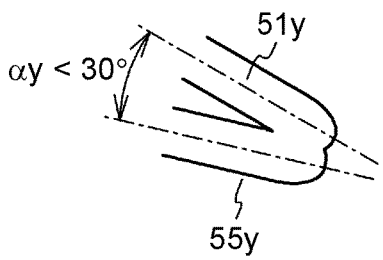
FIG. 5D is an enlarged view of leading ends of holes in a comparative example.

FIG. 5D is an enlarged view of holes 51*y*, 55*y* of a comparative example. A relative angle αy between axes of the holes 51*y*, 55*y* is set to be smaller than 30°. This case also means that the amount of overlap between the leading ends of the holes 51*y*, 55*y* is large, and that a larger amount of heat has been applied by laser irradiation to a region where the holes 51*y*, 55*y* overlap each other. Accordingly, also in this case, the radii of curvature of the leading ends may be too large, and ductile fracture may be more likely to occur. It is therefore preferable that the relative angle α satisfy 30°≤α. Since the relative angle α between the holes 51, 55 of the embodiment is set to approximately 60°, making the radii of curvature of the leading ends too large is avoided.

Figure 5E:
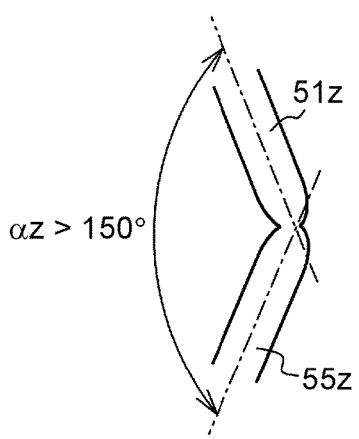
FIG. 5E is an enlarged view of leading ends of holes in a comparative example.

FIG. 5E is an enlarged view of holes 51*z*, 55*z* of a comparative example. A relative angle αz between axes of the holes 51*z*, 55*z* is set to be larger than 150°. In this case, a laser beam is required to be applied to the inner circumferential surface of the through-hole 14 at too steep an angle, making it difficult to form the holes 51*z*, 55*z* as well as to secure the depth of the holes 51*z*, 55*z*. When the depth of the holes 51*z*, 55*z* cannot be secured, ductile fracture may be more likely to occur due to the low factor of stress concentration. It is therefore preferable that the relative angle α satisfy α≤150°. Since the relative angle α between the holes 51, 55 of the embodiment is set to substantially 60°, it is easy to form the holes 51, 55 as well as to secure the depth of the holes 51, 55.

As has been described above, to realize brittle fracture, it is preferable that the distance A satisfy—(d/4)≤A≤d and that the relative angle α satisfy 30°≤α≤150°. It is more preferable that the distance A satisfy—(d/8)≤A≤d/2 and that the relative angle α satisfy 15°≤α≤75°.

It is preferable that each of the pitches P1, P5 be about twice the inside diameter d of the hole. When the pitch is too narrow, a large number of holes are required to be formed in a narrow region by laser beam machining. As a larger amount of heat is applied to the base member 1 by laser irradiation, the temperature of the base member 1 rises, which may affect the dimensional accuracy of the holes during laser beam machining. Moreover, the manufacturing cost may increase due to the increased number of times of laser irradiation.

As shown in FIG. 2B, it is preferable that the holes 51, 55 that are adjacent to each other communicate with each other at the open ends opening in the inner circumferential surface of the through-hole 14. This is because the fracture strength on the inner circumferential surface side of the through-hole 14 can be reduced and brittle fracture can be thereby secured when the open ends communicate with each other, compared with when the open ends are separated from each other without communicating with each other.

In the fracture surfaces of the rod part 20 and the cap part 30, the holes 51, 55 before fracture are exposed in the form of grooves. In a state where the fracture surfaces are positioned relative to each other after fracture, however, the same holes 51, 55 as in the state before fracture are defined again between the fracture surfaces. The same description applies to the fracture start portion 60. Thus, also a connecting rod that has been manufactured by fastening together the rod part 20 and the cap part 30 after fracture can be checked as to whether the holes 51, 55 of the fracture start portion 50 satisfy the above requirements.

Next, a plurality of modified examples will be described. FIG. 6A to FIG. 7B are enlarged views of holes that are the modified examples. In these modified examples, too, the same components as in the embodiment will be denoted by the same reference signs to omit an overlapping description. Holes 51*a*, 55*a* of a fracture start portion 50*a* shown in FIG. 6A are formed in a V-shape as seen in a sectional view. Unlike the holes 51, 55 of the above embodiment, the holes 51*a*, 55*a* do not communicate with each other at intermediate portions, and a relative angle αa therebetween is set to approximately 30°. Specifically, the hole 51*a* communicates with one of two holes 55*a* that are adjacent to each other at ends opening in the inner circumferential surface of the through-hole 14, and communicates with the other one of the two holes 55*a* at leading ends. Similarly, the hole 55*a* communicates with one of two holes 51*a* that are adjacent to each other at the ends opening in the inner circumferential surface of the through-hole 14, and communicates with the other one of the two holes 51*a* at the leading ends. Also in this case, the fracture strength can be reduced in each region surrounded by the holes 51*a*, 55*a* that are adjacent to each other and the inner circumferential surface of the through-hole 14, and brittle fracture can be thereby secured.

Holes 51, 55*b* of a fracture start portion 50*b* shown in FIG. 6B are formed in a V-shape as seen in a sectional view. The holes 55*b* extend substantially parallel to the X-direction. In other words, the holes 55*b* extend in a radial direction of the through-hole 14. Like the holes 55*b*, the holes may extend in a direction orthogonal to the inner circumferential surface of the through-hole 14. Also in this case, the fracture strength can be reduced in each region surrounded by the holes 51, 55*b* that are adjacent to each other and the inner circumferential surface of the through-hole 14, and brittle fracture can be thereby secured. A relative angle αb between axes of the holes 51, 55*b* is set to approximately 30°.

Figure 7A:
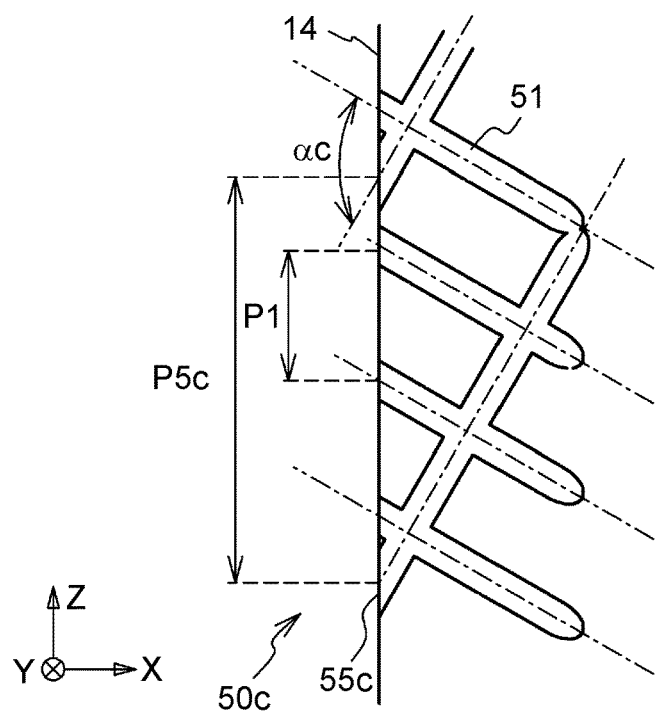
FIG. 7A is an enlarged view of holes that are a modified example.

A pitch P5c of holes 55*c* of a fracture start portion 50*c* shown in FIG. 7A is set to be approximately three times the pitch P1 of the holes 51, and thus the pitch ratio is set to 1:3.

Thus, a smaller number of the holes 55c are required relative to the holes 51, so that the number of times of laser irradiation for forming the holes 55c can be reduced and the manufacturing process can be simplified. Moreover, since the hole 55c communicates with four holes 51, the fracture strength can be reduced and brittle fracture can be thereby secured. Also in this case, regions surrounded by the hole 55c, the four holes 51 communicating with this hole 55c, and the inner circumferential surface of the through-hole 14 are secured, so that the fracture strength can be reduced and brittle fracture can be thereby secured. However, when holes extending in different directions communicate with each other and have a pitch ratio larger than 1:3, the relative angle between these holes may be so large as to make it difficult to apply a laser beam to the inner circumferential surface of the through-hole 14. It is therefore preferable that the pitch ratio be between 1:1 and 1:3. A relative angle $\alpha c$ between axes of the holes 51, 55c is set to approximately 90°. In this modified example, it is not absolutely necessary that the hole 55c communicates with four holes 51, as long as the hole 55c communicates with one of two holes 51 that are adjacent to each other at intermediate portions, and communicates with the other one of these two holes 51 at intermediate portions.

Figure 7B:
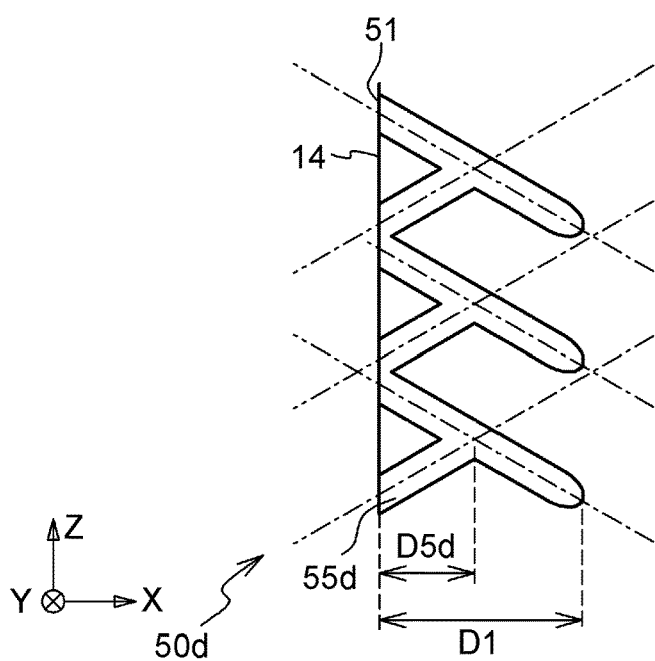
FIG. 7B is an enlarged view of holes that are a modified example.

A depth D5d of a hole 55d shown in FIG. 7B is set to half the depth D1 of the hole 51, and thus the ratio between the depths of the holes is set to 1:0.5. Thus, the hole 55d is formed to be shorter than the hole 51. Also in this case, regions between the holes 51, 55d and the inner circumferential surface of the through-hole 14 are secured, so that the fracture strength can be reduced and brittle fracture can be thereby secured. Since the hole 55d communicates with the hole 51 at an intermediate portion of the hole 51, the fracture strength can be further reduced and brittle fracture can be thereby secured. Moreover, since the depth of the hole 55d is smaller than the depth of the hole 51, the hole 55d can be formed by laser beam machining at lower laser output power and in a shorter time, which can reduce the manufacturing cost.

Although it is preferable that two holes that are adjacent to each other and extend in different directions communicate with each other at the open ends as shown in FIG. 6A, FIG. 6B, and FIG. 7B, the present disclosure is not limited to this arrangement and the open ends may be separated as shown in FIG. 7A.

Figure 8:
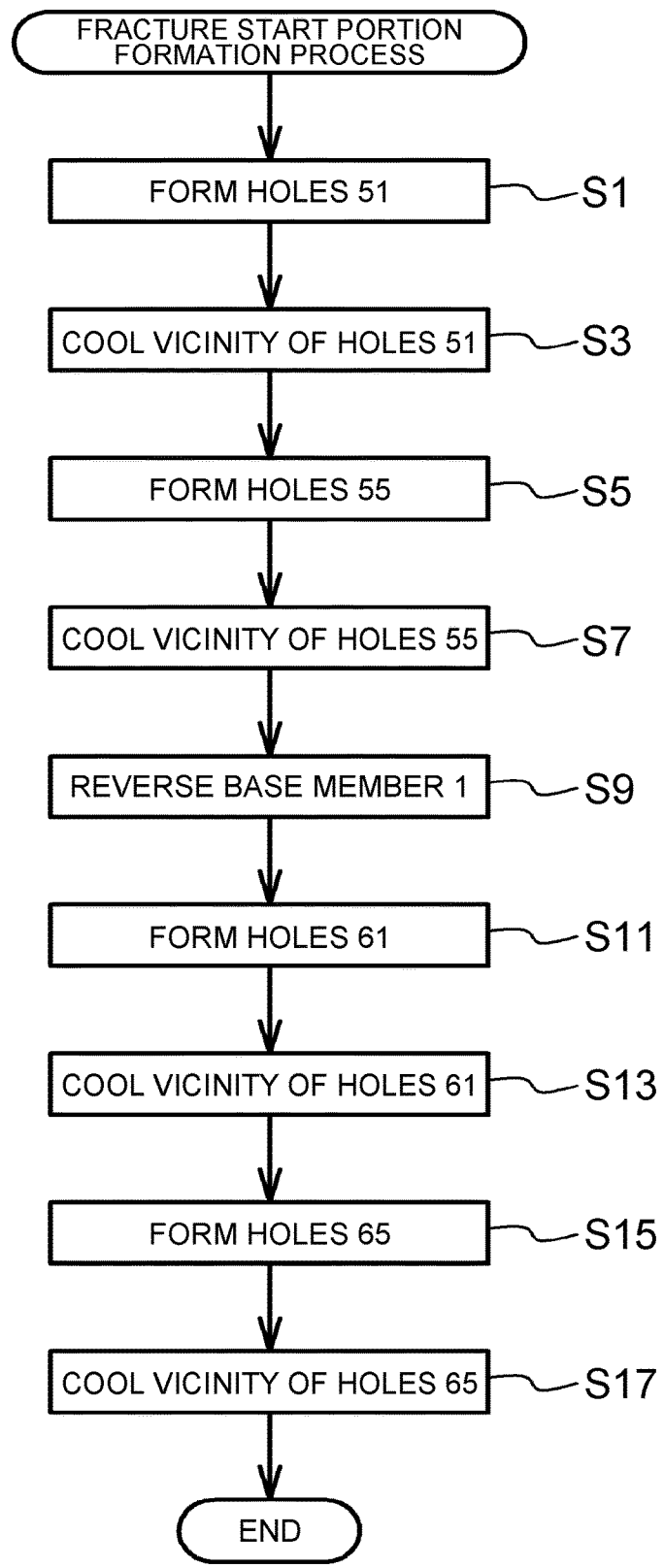
FIG. 8 is a flowchart showing a fracture start portion formation process.

Next, a process of forming the fracture start portions 50, 60 in a connecting rod manufacturing process will be described. FIG. 8 is a flowchart showing the process of forming the fracture start portions 50, 60. FIG. 9A to FIG. 10C are views illustrating the process of forming the fracture start portions 50, 60. First, as shown in FIG. 9A, the holes 51 are formed by applying a laser beam from a laser oscillator 100 to a part of the inner circumferential surface of the through-hole 14 of the base member 1 on the side of the bolt hole 15 while controlling the travel direction of the laser beam using a prism 110 disposed on one side of the base member 1 (step S1). The process of step S1 is an example of the first process of forming the holes 51 as the fracture start portion 50 so as to be arrayed in the Z-direction and extend in the first direction. Next, as shown in FIG. 9B, the vicinity of the holes 51 in the base member 1 that has reached a high temperature as a result of laser irradiation is cooled (step S3). This cooling may be cooling by natural heat release or may be forced cooling using a fan etc.

Figure 9C:
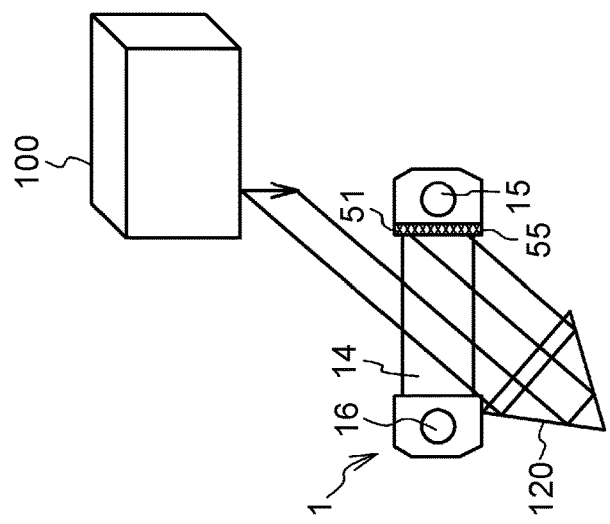
FIG. 9C is a view illustrating the fracture start portion formation process.
Figure 9B:
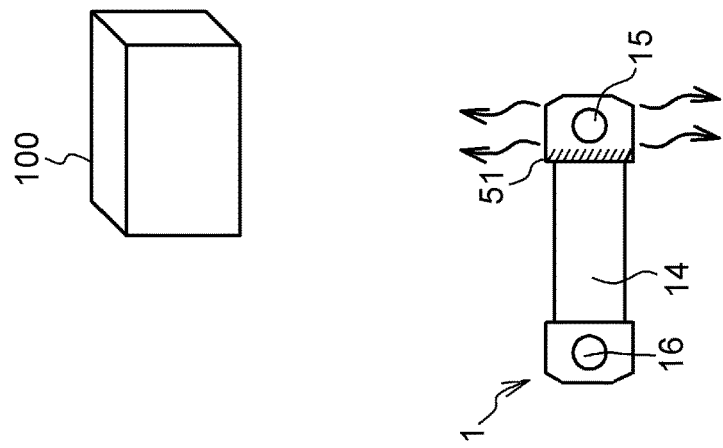
FIG. 9B is a view illustrating the fracture start portion formation process.
Figure 9A:
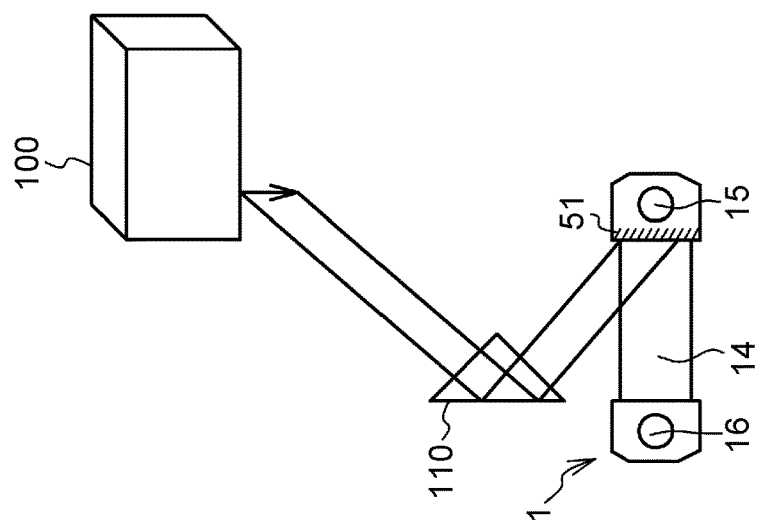
FIG. 9A is a view illustrating the fracture start portion formation process.

Next, as shown in FIG. 9C, the holes 55 are formed by applying a laser beam from the laser oscillator 100 to a part of the inner circumferential surface of the through-hole 14 on the side of the bolt hole 15 while controlling the travel direction of the laser beam using a prism 120 disposed on the other side of the base member 1 (step S5). The process of step S5 is an example of the second process of forming the holes 55, in addition to the holes 51, as the fracture start portion 50 so as to be arrayed in the Z-direction and extend in the second direction different from the first direction relative to the holes 51. Next, the vicinity of the holes 55 in the base member 1 is cooled in the same manner as described above (step S7). Next, as shown in FIG. 10A, the base member 1 is reversed (step S9), and the holes 61 are formed in a part of the inner circumferential surface of the through-hole 14 on the side of the bolt hole 16 using the prism 110 again (step S11). Thus, the holes 61 are formed so as to be parallel to the holes 51. The process of step S11 is an example of the above-described first process. Next, as shown in FIG. 10B, the vicinity of the holes 61 in the base member 1 is cooled (step S13). Next, the holes 65 are formed by applying a laser beam to a part of the inner circumferential surface of the through-hole 14 on the side of the bolt hole 16 using the prism 120 again (step S15). Thus, the holes 65 are formed so as to be parallel to the holes 55. The process of step S15 is an example of the above-described second process. Next, the vicinity of the holes 65 in the base member 1 is cooled in the same manner as described above (step S17). Thus, the fracture start portions 50, 60 are formed in the base member 1. The holes 61, 65 are examples of the first and second holes.

The reason for cooling an irradiated part after laser irradiation as described above is as follows. When a laser beam is applied to a part again that has reached a high temperature as a result of laser irradiation, this part reaches an even higher temperature, which may cause the hole to become larger beyond a desired hole diameter or a desired radius of curvature of the leading end. Thus, brittle fracture may fail to be secured due to the reduced dimensional accuracy of the hole, especially the increased radius of curvature of the leading end of the hole. To secure brittle fracture, therefore, an irradiated part should be cooled after laser irradiation, before a laser beam is applied again as in the embodiment.

Figure 11:
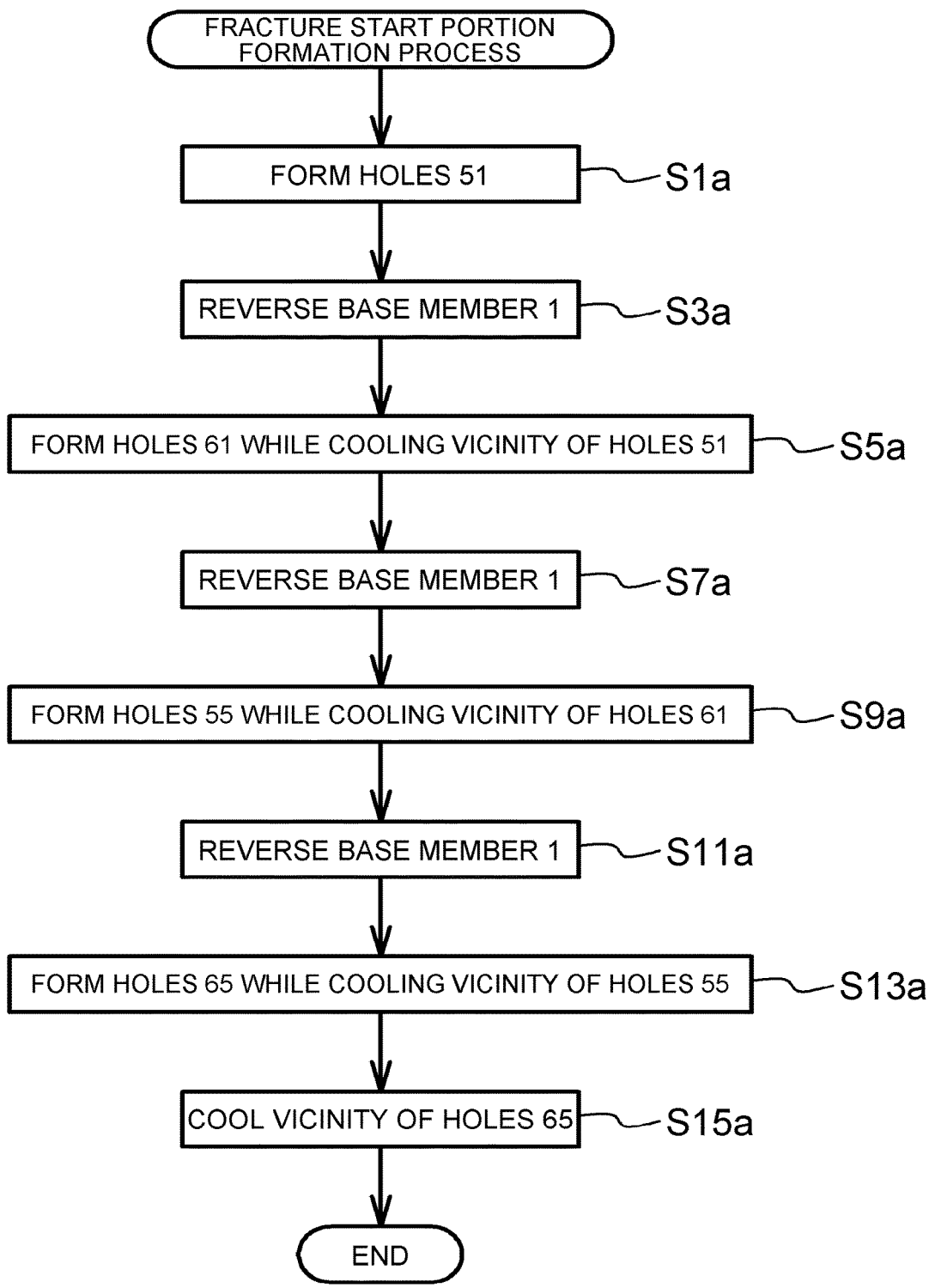
FIG. 11 is a flowchart showing a modified example of the fracture start portion formation process.

Next, a modified example of the process of forming the fracture start portions 50, 60 will be described. FIG. 11 is a flowchart showing the modified example of the process of forming the fracture start portions 50, 60. FIG. 12A to FIG. 12D are views illustrating the modified example of the process of forming the fracture start portions 50, 60. First, as shown in FIG. 12A, the holes 51 are formed in a part of the inner circumferential surface of the through-hole 14 on the side of the bolt hole 15 in the same manner as described above (step S1a). The process of step S1a is an example of the above-described first process. Next, as shown in FIG. 12B, the base member 1 is reversed (step S3a), and the holes 61 are formed in a part of the inner circumferential surface of the through-hole 14 on the side of the bolt hole 16 using the prism 110, while the vicinity of the holes 51 in the base member 1 is cooled (step S5a). The process of step S5a is an example of the process of forming the holes 61 as the fracture start portion 60 by laser beam machining, while the third process of cooling the fracture start portion 50 is in progress after the holes 51 are formed as the fracture start portion 50 by laser beam machining in the first process and before the holes 55 are formed as the fracture start portion 50 in the second process. Next, as shown in FIG. 12C, the base member 1 is reversed (step S7a), and the holes 55 are formed in a part of the inner circumferential surface of the through-hole 14 on the side of the bolt hole 15 using the prism 120, while the vicinity of the holes 61 in the base member 1 is cooled (step S9a). The process of step S9a is an example of the process of forming the holes 55 as the fracture start portion 50 by laser beam machining, while the third process of cooling the fracture start portion 60 is in progress after the holes 61 are formed as the fracture start portion 60 by laser beam machining in the first process and before the holes 65 are formed as the fracture start portion 60 in the second process. Thus, the fracture start portion 50 is formed. Next, as shown in FIG. 12D, the base member 1 is reversed (step S11a), and the holes 65 are formed in a part of the inner circumferential surface of the through-hole 14 on the side of the bolt hole 16, while the vicinity of the holes 55 in the base member 1 is cooled (step S13a). Next, the vicinity of the holes 65 in the base member 1 is cooled (step S15a). Thus, the fracture start portion 60 is formed.

It is possible to form the fracture start portions 50, 60 in the base member 1 in a short time by applying a laser beam to another part while cooling a part having been irradiated with a laser beam, as has been described above. Thus, the manufacturing cost of the connecting rod can be reduced.

While the case where the fracture start portions 50, 60 are formed by using one laser oscillator 100 has been described in the above process, the present disclosure is not limited to this example. The fracture start portions 50, 60 may be formed by using a plurality of laser oscillators 100 disposed at different positions. A mirror that reflects a laser beam may be used instead of the prisms 110, 120. An assist gas may be used to discharge material melted by laser irradiation from a hole being machined.

While the embodiments of the present disclosure have been described in detail above, the present disclosure is not limited to these specific embodiments but can be changed or modified in various ways within the scope of the gist of the disclosure described in the claims.

What is claimed is:

1. A connecting rod comprising:
   a rod part having a fracture surface; and
   a cap part that has a fracture surface, and defines a through-hole together with the rod part in a state where the fracture surfaces are positioned relative to each other, wherein
   in the state where the fracture surfaces are positioned relative to each other, a plurality of first holes that is arrayed in an axial direction of the through-hole and extends in a first direction from an inner circumferential surface of the through-hole, and a plurality of second holes that is arrayed in the axial direction and extends from the inner circumferential surface in a second direction different from the first direction relative to the first holes, are present between the fracture surfaces.

2. A connecting rod manufacturing method comprising:
   forming, in an inner circumferential surface of a through-hole formed at an end of the connecting rod, first holes as fracture start portions such that the first holes are arrayed in an axial direction of the through-hole and extend in a first direction;
   forming second holes as the fracture start portions, each between adjacent ones of the first holes, such that the second holes are arrayed in the axial direction and extend in a second direction different from the first direction relative to the first holes; and
   fracture-splitting the end of the connecting rod into a rod part and a cap part using the fracture start portions as start points.

3. The connecting rod manufacturing method according to claim 2, wherein one of the first holes and one of the second holes that are adjacent to each other partially communicate with each other.

4. The connecting rod manufacturing method according to claim 2, wherein one of the first holes and one of the second holes that are adjacent to each other communicate with each other at ends opening in the inner circumferential surface.

5. The connecting rod manufacturing method according to claim 2, wherein one of the first holes communicates with a first one of the second holes, located at one end of three of the second holes that are adjacent to one another, at ends opening in the inner circumferential surface, communicates with a second one of the second holes, located at the other end of the three second holes, at leading ends, and communicates with a third one of the second holes, located between the one end and the other end of the three second holes, at intermediate portions.

6. The connecting rod manufacturing method according to claim 2, wherein one of the first holes communicates with one of two of the second holes that are adjacent to each other at ends opening in the inner circumferential surface, and communicates with another one of the two second holes at leading ends.

7. The connecting rod manufacturing method according to claim 6, wherein the two second holes extend in a direction orthogonal to the inner circumferential surface of the through-hole.

8. The connecting rod manufacturing method according to claim 2, wherein one of the second holes communicates with one of two of the first holes that are adjacent to each other at intermediate portions, and communicates with another one of the two first holes at intermediate portions.

9. The connecting rod manufacturing method according to claim 2, wherein one of the second holes is shorter than one of the first holes.

10. The connecting rod manufacturing method according to claim 2, further comprising cooling the fracture start portions between forming the first holes and forming the second holes.

11. The connecting rod manufacturing method according to claim 10, wherein:
    the fracture start portions include a first fracture start portion and a second fracture start portion facing each other across a center of the through-hole; and
    the first holes or the second holes are formed as the second fracture start portion by laser beam machining, while cooling of the first fracture start portion is in progress after the first holes are formed as the first fracture start portion by laser beam machining and before the second holes are formed as the first fracture start portion.

12. The connecting rod manufacturing method according to claim 2, wherein a relationship between an inside diameter d of each of the first holes and the second holes of which leading ends are adjacent to each other and a distance A in the axial direction between the leading ends satisfies—$(d/4) \leq A \leq d$.

13. The connecting rod manufacturing method according to claim 2, wherein a relative angle $\alpha$ between axes of one of the first holes and one of the second holes satisfies $30° \leq \alpha \leq 150°$.

* * * * *